(No Model.)
T. PHARES.
Hay Press.
No. 236,253. Patented Jan. 4, 1881.
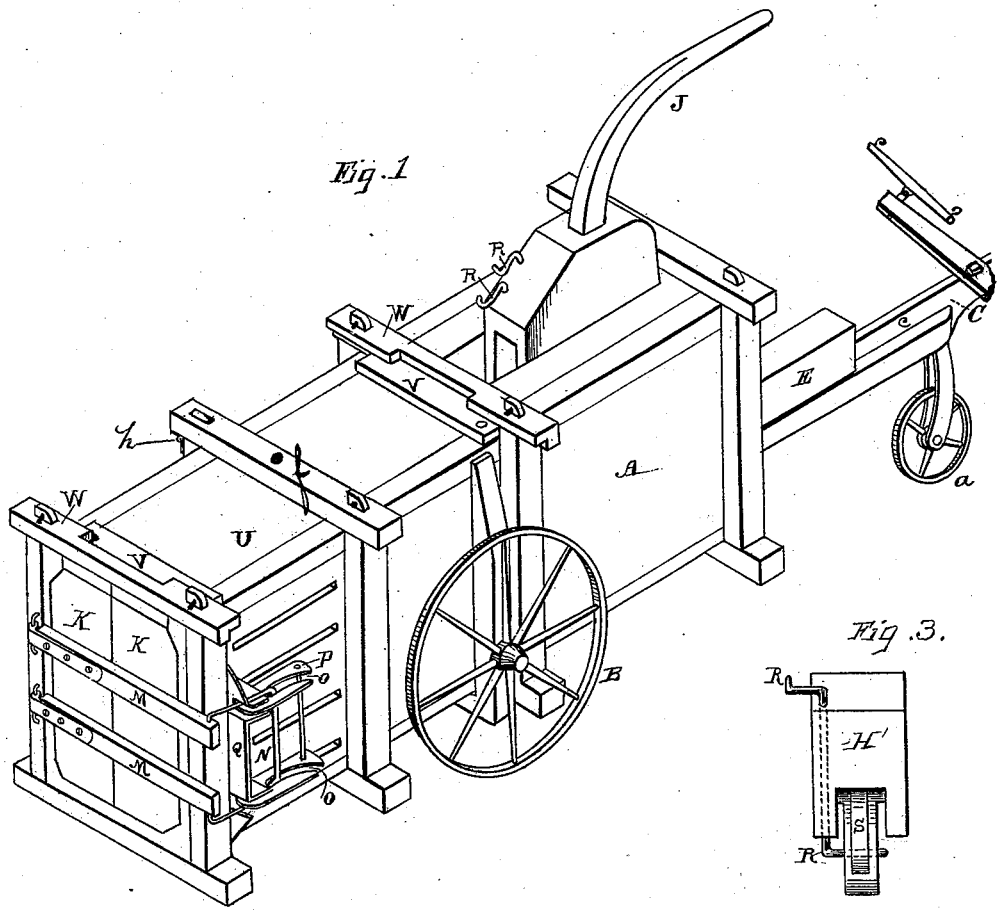
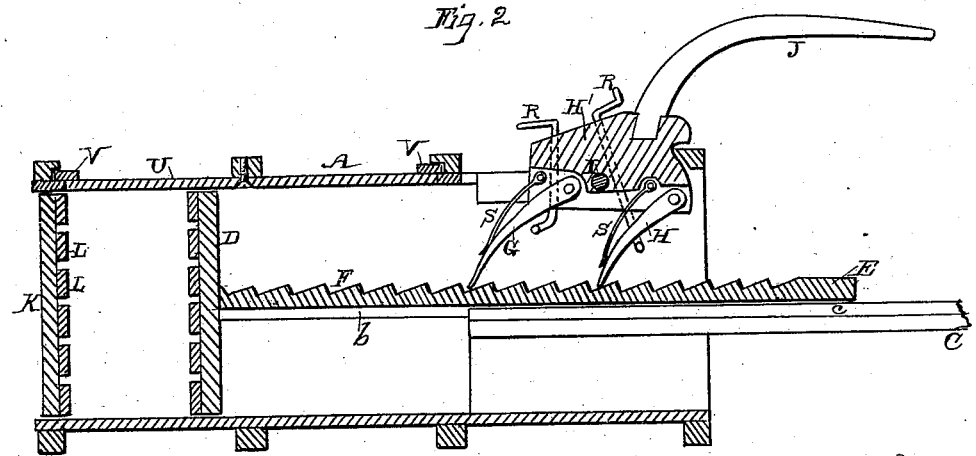
Witnesses
Frank A. Brooks
Geo. H. Strong
Inventor
Thomas Phares
By Dewey & Co.
Attys

UNITED STATES PATENT OFFICE.

THOMAS PHARES, OF EUREKA, CALIFORNIA, ASSIGNOR OF ONE-HALF TO JAMES R. McGINNIS, OF MOUNTAIN CITY, NEVADA.

HAY-PRESS.

SPECIFICATION forming part of Letters Patent No. 236,253, dated January 4, 1881.

Application filed April 14, 1880. (No model.)

*To all whom it may concern:*

Be it known that I, THOMAS PHARES, of Eureka, county of Humboldt and State of California, have invented an Improved Hay-Press; and I hereby declare the following to be full, clear, and exact description thereof.

My invention relates to certain improvements in apparatus which is employed for baling such substances as are to be compressed into smaller bulk for economy in transportation and for other purposes; and it is especially useful in baling hay which has been raked up in the field without transporting it to a stack, so that the hay may be baled at once, when cured, with no more handling than is necessary to place it directly in the press.

My invention consists in the employment of a horizontal press mounted upon low wheels, and provided with means for attaching a team by which it may be drawn about the field, so that it may be filled with hay which has been previously raked into windrows, in combination with a horizontally-moving follower, actuated by a peculiar double pawl and oscillating pawl-block by means of a hand-lever, so as to compress the hay after the press has been filled and while traveling about.

My invention also consists in a rear gate with a self-acting latch to release the bale after it has been tied. The pawls are lifted and held out of contact with the ratchet-bar while the follower is retracted to allow the press to be filled again.

My invention also consists in certain details of construction and combinations of devices, as hereinafter more fully described and claimed.

Referring to the accompanying drawings for a more complete explanation of my invention, Figure 1 is a perspective view of my press. Fig. 2 is a longitudinal vertical section. Fig. 3 is a front view of the pawl-block.

In the construction of baling-presses the power necessary to compress a bale properly has made it necessary in most cases to have the press stationary, whether it be vertical or horizontal, in order to apply sufficient power and in a suitable manner.

In my invention I am able to compress a bale sufficiently by hand-power through the peculiar mechanism employed, and the press may therefore be mounted upon wheels, so as to move from place to place while at work.

A is the body of my press, having its greatest length in a horizontal direction, so as to form what is known as a "horizontal press." This body is mounted upon wheels B, and a rigid pole, C, projects from the front end, so that a team may be attached to draw the press about from place to place. A caster-wheel, $a$, is mounted beneath the pole by means of a swiveling standard, as shown, to support this end and allow it to turn easily in any direction.

The follower D has a stout beam or stem, E, projecting from its rear side and extending out over the pole or tongue. In order to guide this beam in its movements and preserve it in a line as it moves out and in, I have formed a groove, $b$, in its lower face, and a corresponding tongue, $c$, upon the top of the pole, so that the follower-beam fits upon and is guided by this tongue as it moves. The upper surface of the beam E is provided with a stout ratchet-bar, F, in which the pawls work to move the beam and follower to compress the bale.

The apparatus for moving the beam and follower consists of two pawls, G and H, which are pivoted to the front and rear end of an oscillating pawl-block, H'. This block is strongly made, preferably of iron, and has an axle or shaft, I, through its lower part, about which it oscillates. From the upper part of this block a lever, J, projects, and may be curved, as shown, to bring it into convenient position for the application of the power. The pawls are pivoted or have their journals in the block, respectively before and behind the axis about which it turns.

In practice I have found that the rear pawl has a greater power than the front one, and in order to equalize this power, and also the amount of movement of the two, I have set the front pawl nearer to the axis of the block. The oscillating movement of the block upon its axis when the lever J is moved up and down produces a compound action upon the pawls similar to that of a knee-lever—that is, when the block is forced down or moved upon its axis it carries the pawl downward and forward in a curve, which is the resultant of the two motions in one. As one pawl is forced forward the other one is retracted until it falls into the tooth of the ratchet-bar in rear of its former position, and as the other pawl is pushing the beam E forward while this pawl is being retracted, it will be seen that each pawl moves only one-half the length of one tooth in the ratchet-bar. By this means I produce a very powerful action upon the follower, which may be forced inward until the bale is sufficiently compressed. The face of the follower, the rear door, and the sides of the press at the point where the compressed bale will lie are slotted to admit the baling-ropes, which are introduced and tied in the usual manner. The rear door or gate, K, is made in two halves, divided vertically. The transverse bars L, between which the baling-ropes pass, are secured to one leaf of the door, so as to overlap the opposite leaf from the inside, while the securing-bars M upon the outside are secured to the other leaf and overlap the first-mentioned leaf. By this construction the direct pressure of the bale is transferred to the edges of the doors, where the hinges are the strongest, instead of pressing upon the center of the door.

The securing device consists of a strong loop, N, which has its ends swiveled or hinged in the projecting free ends of the securing-bars M, while its bight is adapted to enter slots O in a frame or plate, P, which swings around a vertical axis, Q, upon the side of the press. This vertical axis stands out a little beyond the line of the point where the loop is connected with the bars M, and when the loop lies in the slots O the frame P is swung back against the side of the press. This causes the loop to lie inside the line of the vertical shaft, and it is thus locked and prevented from becoming unlatched by any strain which may be brought upon it. After the bale has been tied this frame may be swung around until it passes the line of the axis, when the pressure upon the doors by the bale will be sufficient to force the doors open and allow the bale to escape.

After the bale has been completed and ejected from the press the follower is withdrawn by releasing its ratchet from the pawls. This is done by means of two holding-arms, R, which extend through the pawl-block, as shown, and have their ends bent, so as to hook beneath the pawls when turned around, and thus lift them and hold them up free of the ratchet until released. Springs S hold the pawls down when at work, so as to insure their engaging the ratchet. By this construction I am enabled to move my press from one pile of hay to another as it lies raked up in the field, and the hay may be easily thrown into the press and tramped until full, after which the press is closed and the follower is forced forward, as described. The whole operation may be completed in this manner, while the press is moving, and there will be no necessity for stacking the hay or for frequent handling of it.

The top door, U, is bolted to the central cross-bar, $f$, and one end of bar $f$ is hinged to one of the vertical timbers at $h$, so that when it is raised the end turns on the hinge and it lifts the door U. At each end of the door U, crossing the press, are transverse timbers W, fastened by tenons and pins to the vertical timbers, and having flanges projecting, as shown, and the bars V, which are pivoted to and swing upon the edges of the press and are turned across the door, so that their edges lie beneath these projecting flanges of timbers W, and serve to lock the door after it is closed.

Having thus described my invention, what I claim as new, and desire to secure by Letters Patent, is—

1. In a horizontal press mounted upon the wheels B, and provided with a draft-pole, C, the follower D, having the central and direct actuating-beam, E, guided in its reciprocating movements by the tongue and groove $b$ $c$ upon the pole, substantially as herein described.

2. A horizontal baling-press having the bearing-wheels B and the rigid centrally-placed draft-pole C, with its caster-wheel $a$, as shown, in combination with the follower D and central actuating-beams E, said beam being adapted to move upon and be guided by the pole, substantially as herein described.

3. In a baling-press having the horizontally-moving follower D and beam E, the oscillating pawl-block H, having its fulcrum at I, and provided with the pawls G and H, having their upper ends swiveled in the block before and behind the fulcrum, respectively, while their lower ends alternately engage the teeth of the rack or ratchet-bar F of the beam E to move the follower, substantially as herein described.

4. The oscillating pawl-block H, journaled and actuated by the hand-lever J, and having the spring-pawls pivoted to it, so as to act alternately upon the rack-bar F of the follower, as shown, in combination with the arms R, whereby the pawls may be disengaged and held out of contact with the rack, substantially as and for the purpose herein described.

5. The discharge door or gate K, formed of two leaves with beveled meeting edges, with the transverse interior bars, L, secured to one leaf and the exterior bars, M, secured to the other leaf, so that each set of bars overlap the opposite leaf to brace and strengthen it, substantially as herein described.

6. The discharge-door K, with its exterior securing-bars, M, in combination with the loop N, adapted to enter the slots O in the frame P, said frame turning upon a vertical axis, so as to carry the loop beyond its axis, and thus fasten the door without other hooks or fastening, substantially as herein described.

7. The door U, secured to the hinged mortised cross-bar $f$, adapted to fit tenons upon vertical side posts, as shown, in combination with the locking-bars V, said bars being adapted to swing across the door and latch beneath the flanged cross-timbers W, substantially as and for the purpose herein described.

In witness whereof I have hereunto set my hand.

THOS. PHARES.

Witnesses:
GEO. H. STRONG,
FRANK A. BROOKS.